UNITED STATES PATENT OFFICE.

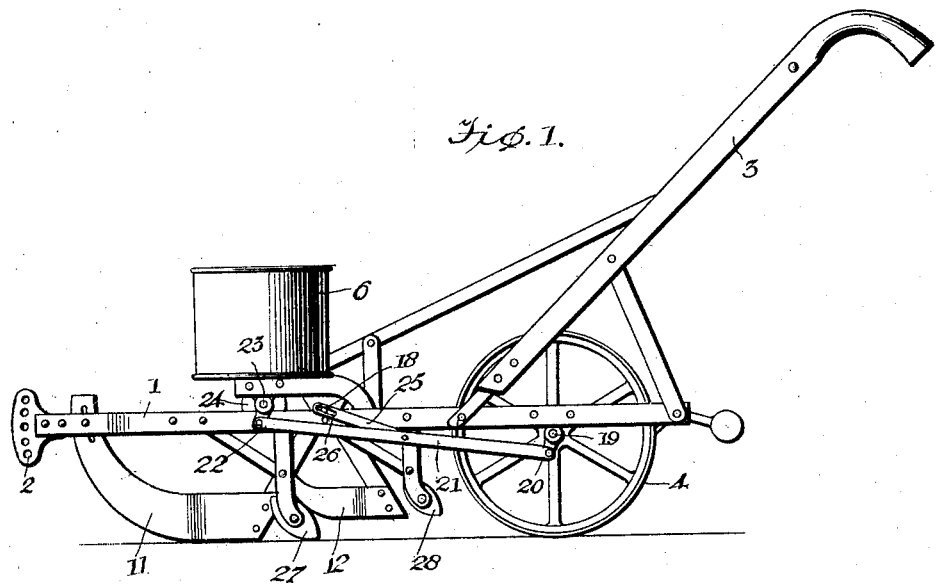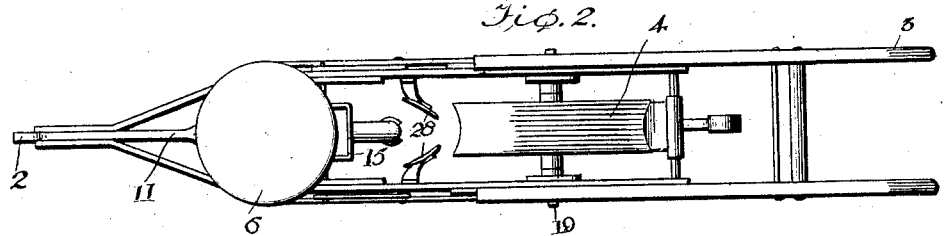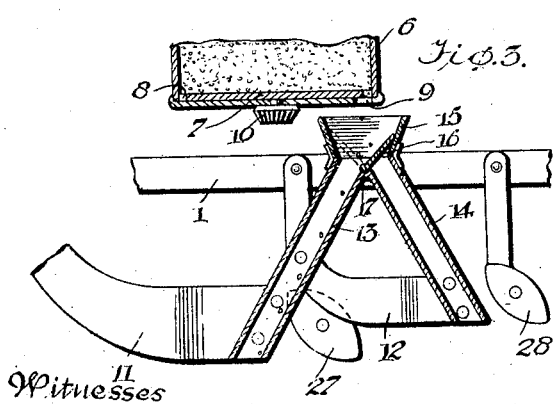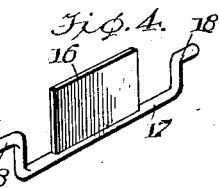

HENRY B. BARFIELD, OF FORT NECESSITY, LOUISIANA.

COTTON-PLANTER.

1,362,834.  Specification of Letters Patent.  Patented Dec. 21, 1920.

Application filed March 18, 1920. Serial No. 366,812.

*To all whom it may concern:*

Be it known that I, HENRY BENSON BARFIELD, a citizen of the United States, and a resident of Fort Necessity, in the parish of Franklin and State of Louisiana, have invented certain new and useful Improvements in Cotton-Planters, of which the following is a specification.

My invention is an improvement in cotton planters, and has for its object to provide a planter of the character specified by means of which cotton seed may be planted at different depths, to insure a fair stand of growing plants, regardless of weather conditions which might hinder the sprouting of deep or shallow planted seed.

In the drawings:

Figure 1 is a side view of the improved planter;

Fig. 2 is a bottom plan view;

Fig. 3 is a sectional detail of the distributing mechanism;

Fig. 4 is a perspective view of the distributing valve.

In the present embodiment of the invention the improved planter comprises the usual frame 1 having at one end the clevis 2 for connection with draft apparatus and at the other the handle 3, and the frame is supported by a covering wheel 4 of usual construction, the said wheel having a concave periphery.

At the front of the frame and supported above the same there is arranged a magazine 6 for the cotton seed, and the seed are fed through a dropping disk 7 mounted to rotate in the bottom of the magazine or hopper. This disk, which is of usual construction, has openings 8 near its periphery, into which the seed may drop, and the bottom of the reservoir has at the side adjacent to the covering wheel an opening 9 with which the openings 8 are adapted to come into register in succession, to permit the seed held in each of the said openings 8 to drop through the opening 9 into the legs or furrow openers.

The disk 7 is rotated by means of a beveled pinion 10 which is secured thereto at the axis of the magazine, and this pinion is driven from the covering wheel 4 in the usual manner. The construction above described is the usual construction of cotton seed dropper and forms no part of my invention.

The invention resides in providing furrow openers 11 and 12 of usual construction, which are supported by the frame below the same in longitudinally and vertically spaced relation. These furrow openers are of usual construction, and they are vertically adjustable with respect to the frame 1.

Legs 13 and 14 lead from a hopper 15 to the space between the blades of the furrow openers at the rear thereof, the leg 13 delivering to the opener 11 and the leg 14 to the opener 12. It will be understood that these furrow openers consist of two blades which gradually diverge toward their rear ends, the blades being connected at their fronts, to open a furrow, and that the cotton seed is dropped into the space between the blades near the rear of the openers.

The opener 12 is spaced rearwardly from the opener 11 and is also at a higher level, so that the seed dropped through this opener will be less deeply planted than those dropped through the opener 11. The hopper 15 is supported directly below the opening 9 in the magazine, and the legs 13 and 14 diverge forwardly and rearwardly from this hopper to the respective furrow openers.

A gate or valve 16 is arranged within the hopper 15 at the junction of the legs 13 and 14, and the said gate or valve is secured to a shaft 17 which is provided at each end with a crank 18. The ends of the shaft between the valve and the cranks are journaled in the walls of the hopper, and the gate is so arranged that when the shaft 17 is oscillated the valve will be swung from side to side of the hopper, to alternately close the communications between the hopper and the respective legs.

The covering wheel 4 is secured to a shaft or axle 19 which is journaled in bearings in the frame 1 and at each end this shaft has a crank arm 20. Links 21 connect the crank arm with crank arms 22 on a countershaft 23 which is journaled below the magazine and which has a bevel gear 24 meshing with the beveled pinion 10 before mentioned.

When the planter is drawn through the field the crank arms 20—22 and the links 21 will cause the shaft 23 to be rotated, and this in turn will rotate the pinion 10 and the dropping disk 7, so that a continuous succession of seed will be fed to the hopper 15.

Links 25 connect the crank arms 18 with the crank 21, the said links 25 having longitudinally extending slots 26 for receiving the pins of the crank arms and at their opposite ends the links are pivoted to the links 21 intermediate the ends of the said links 21.

The connection between the crank shaft 17 and the links 25 is a lost motion connection, and the arrangement is such that the link 21 will be near the end of its stroke in each direction before the gate or valve 16 will be operated. Because of this arrangement, the gate or valve will be swung quickly from front to rear, shutting off first one leg and then the other from the hopper. The arrangement is such that a sequence of seed will be dropped through each leg alternately. First there will be a sequence of seed through the leg 13 and the furrow opener 11. This sequence of seed will extend over a distance corresponding to the relation of the connection between the crank shaft and the link 21, and it may be made to cover any desired distance, as, for instance, eight inches. Then the valve 16 is slipped over to close the leg 13 and a sequence of seed will be dropped through the leg 14, covering the same distance of ground. Thus alternately there will be planted sequences of seed at higher and lower levels.

Behind each furrow opener there is arranged a pair of covering plows indicated at 27 and 28, respectively, of usual construction and supported by the frame 1. The seed that are planted through the furrow opener 11 are covered by the covering plow 27. Then the furrow opener 12 comes along and opens a furrow of less depth directly above the furrow opener opened by the openers 11.

In alternation seed is dropped into first one furrow and then the other, the seed dropped into the upper portion of the furrow, that is, through the opener 12, being covered by the plows 28. If, through unfavorable weather conditions, the deeply planted seed does not sprout or does not make a stand, the seed in the shallow furrow will sprout and push through the ground. The conditions that are adverse to the deeply planted seed may be favorable to the seed planted at the shallow level. Since in planting cotton seed they are planted in a continuous drill and the superfluous plants are chopped out after they have pushed through the ground, there is no waste or loss in planting by the present method, since should both plantings come up, the greater portion of the plants will necessarily be chopped out.

I claim:

A planter comprising a frame, a plurality of furrow openers depending from said frame, a closing wheel mounted rearwardly of said furrow openers upon an axle having crank portions, a hopper on said frame, a rotary discharge bottom for said hopper, a pair of divergent legs leading from below said hopper to the respective furrow openers, a receptacle at the top of said legs in position to receive seed dropped from said hopper, a shaft journaled at the juncture of said legs with said receptacle and having its ends formed with cranks, a plate carried by said shaft and adapted to cut off communication between either of said legs with the receptacle, links connected with said first named cranks and operatively connected with said rotary bottom whereby to effect movement thereof, and other links connected with said first named cranks and provided with slotted ends engaged upon said last named cranks whereby to effect movement of said plate.

HENRY B. BARFIELD.